(12) United States Patent  (10) Patent No.: US 8,924,632 B2
Post et al.  (45) Date of Patent: Dec. 30, 2014

(54) FASTER TREE FLATTENING FOR A SYSTEM HAVING NON-VOLATILE MEMORY

(75) Inventors: Daniel J. Post, Cupertino, CA (US); Vadim Khmelnitsky, Foster City, CA (US)

(73) Assignee: Apple Inc., Cupertino, CA (US)

( * ) Notice: Subject to any disclaimer, the term of this patent is extended or adjusted under 35 U.S.C. 154(b) by 219 days.

(21) Appl. No.: 13/234,954

(22) Filed: Sep. 16, 2011

(65) Prior Publication Data

US 2013/0073787 A1 Mar. 21, 2013

(51) Int. Cl.
G06F 12/02 (2006.01)
G06F 3/06 (2006.01)

(52) U.S. Cl.
CPC ............ *G06F 3/0608* (2013.01); *G06F 3/0643* (2013.01); *G06F 12/0246* (2013.01); *G06F 2212/7201* (2013.01); *G06F 3/0679* (2013.01)
USPC .................................. 711/103; 711/E12.008

(58) Field of Classification Search
None
See application file for complete search history.

(56) References Cited

U.S. PATENT DOCUMENTS

| | | | |
|---|---|---|---|
| 5,247,634 A | 9/1993 | Cline et al. | |
| 5,604,902 A | 2/1997 | Burkes et al. | |
| 7,035,989 B1 | 4/2006 | Hinker et al. | |
| 7,380,091 B2 | 5/2008 | Bayt | |
| 7,822,941 B2 | 10/2010 | Vick et al. | |
| 2007/0268754 A1 | 11/2007 | Lee et al. | |
| 2008/0276241 A1 | 11/2008 | Bajpai et al. | |
| 2009/0012976 A1 | 1/2009 | Kang et al. | |
| 2009/0043796 A1 | 2/2009 | Sauermann | |
| 2009/0198882 A1 | 8/2009 | Ji et al. | |
| 2011/0022780 A1 | 1/2011 | Wakrat et al. | |
| 2011/0022819 A1 | 1/2011 | Post et al. | |
| 2011/0055458 A1 | 3/2011 | Kuehne | |

OTHER PUBLICATIONS

Post et al., U.S. Appl. No. 12/729,556, filed Mar. 23, 2010.

*Primary Examiner* — Charles Rones
*Assistant Examiner* — Ryan Dare
(74) *Attorney, Agent, or Firm* — Van Court & Aldridge LLP

(57) ABSTRACT

Systems and methods are disclosed for efficient buffering for a system having non-volatile memory ("NVM"). A tree can be stored in volatile memory that includes a logical-to-physical mapping between a logical space and physical addresses of the NVM. When the amount of memory available for the tree is below a pre-determined threshold, a system can attempt to reduce the number of data fragments in the NVM, and consequently flatten a portion of the tree. The NVM interface may select an optimal set of entries of the tree to combine. Any suitable approach can be used such as, for example, moving one or more sliding windows across the tree, expanding a sliding window when a condition has been satisfied, using a priority queue while scanning the tree, and/ or maintaining a priority queue while the tree is being updated.

34 Claims, 15 Drawing Sheets

|  | 1404 | 1408 | 1406 | 1410 |
|---|---|---|---|---|
| MERIT | 42 | 50 | 75 | 90 |
| TOTAL SPAN | 420 | 500 | 750 | 900 |
| STARTING LBA | 120 | 500 | 350 | 600 |

FIG. 14

FASTER TREE FLATTENING FOR A SYSTEM HAVING NON-VOLATILE MEMORY

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

A system having a NVM can include a data structure that maps logical addresses used by a file system to physical addresses of the NVM (e.g., provides a logical-to-physical mapping). The structure can sometimes reside in volatile memory. As existing files are updated or additional files are added, the amount of memory required to store the mapping may increase accordingly. Thus, in some cases, the amount of memory allocated for the structure may be insufficient to capture all of the logical-to-physical mappings.

SUMMARY OF THE DISCLOSURE

Systems and methods are disclosed for faster tree flattening for a system having non-volatile memory ("NVM"). A tree can be stored in volatile memory of the system, where the tree can include a logical-to-physical mapping between a logical space and physical addresses of the NVM. When the amount of memory available for the tree is below a pre-determined threshold, the system can attempt to reduce the number of data fragments in the NVM, and consequently can flatten a portion of the tree. The amount of tree memory that is freed up may be added back to the tree memory pool. The NVM interface may select an optimal set of entries of the tree to combine based on any suitable approach such as, for example, moving one or more sliding windows across the tree, expanding a sliding window when a condition has been satisfied, using a priority queue while scanning the tree, and/or maintaining a priority queue while the tree is being updated.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 14 is a block diagram of another priority queue in accordance with various embodiments of the invention.

DETAILED DESCRIPTION OF THE DISCLOSURE

Systems and methods for faster tree flattening for a system having non-volatile memory ("NVM") are provided. A tree can be stored in volatile memory of the system, where the tree can include a logical-to-physical mapping between a logical space and physical addresses of the NVM. When the amount of memory available for the tree is below a pre-determined threshold, a NVM interface of the system can attempt to reduce the number of data fragments in the NVM, and consequently can flatten a portion of the tree. The amount of tree memory that is freed up can then be added back to the tree memory pool.

The NVM interface may flatten a portion of the tree by, for example, combining an optimal set of entries of the tree into a single entry or node. The optimal set of entries can be contiguous in the logical space but may be non-contiguous in the physical space. Thus, after selecting the optimal set of entries, the NVM interface can reprogram data fragments corresponding to the entries such that the fragments can be physically contiguous. In particular, the NVM interface can reprogram the fragments by reading data corresponding to the multiple entries from the NVM, and then saving the data in volatile memory. After saving the data, the NVM interface can program the data sequentially to a new super block of the NVM.

The NVM interface can select the optimal set of entries using any suitable approach. In some embodiments, the NVM interface can use one or more sliding windows to obtain the optimal set of entries. In some cases, a minimum span can be maintained for each one of the one or more sliding windows. Then, based on a comparison between different minimum spans, the NVM interface can select the optimal set of entries.

In other embodiments, the NVM interface can use a greedy approach in order to find an optimal set of entries to flatten. That is, upon finding an optimal set of entries, the NVM interface can continue to search for additional consecutive entries in the tree that may be added to the optimal set of entries.

In further embodiments, the NVM interface can find an optimal set of entries by maintaining a priority queue in volatile memory. For example, the NVM interface can attempt to insert parameters associated with multiple entries that fit into a sliding window in a priority queue. The NVM interface can continue this process until the sliding window has passed the end of the tree. The NVM interface can then locate the optimal set of entries using the priority queue.

In yet further embodiments, the NVM interface can find an optimal set of entries by maintaining a priority queue of candidate entries while performing tree updates. If the amount of memory available for the tree is later determined to be below a pre-determined threshold, the NVM interface can use the priority queue to find entries that can be combined.

Figure 1:
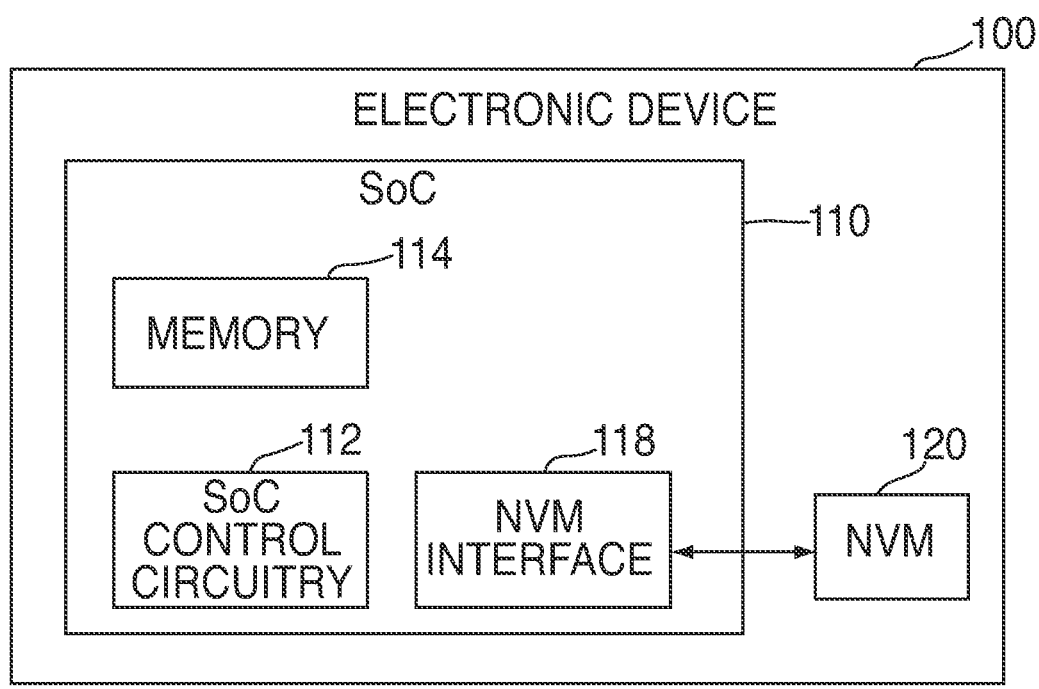
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address).

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write requests to NVM interface 118 to obtain data from or store data in NVM 120. For clarity, data that SoC control circuitry 112 may request for storage or retrieval may be referred to as "user data", even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

In some embodiments, memory 114 can store one or more data structures that can be used by NVM interface 118 to perform its associated operations. For example, memory 114 can include a tree, which can provide logical-to-physical mappings between logical addresses used by a file system and physical addresses of NVM 120. As another example, memory 114 can include one or more priority queues, which can include information that can be used by NVM interface 118 for managing the tree. Trees and priority queues will be described in more detail in connection with FIGS. 4-14.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or SD card, that includes NVM 120 and some or all portions of NVM interface 118. In these embodiments, SoC 110 or SoC control circuitry 112 may act as the host controller for the target device. For example, as the host controller, SoC 110 can issue read and write requests to the target device.

Figure 2:
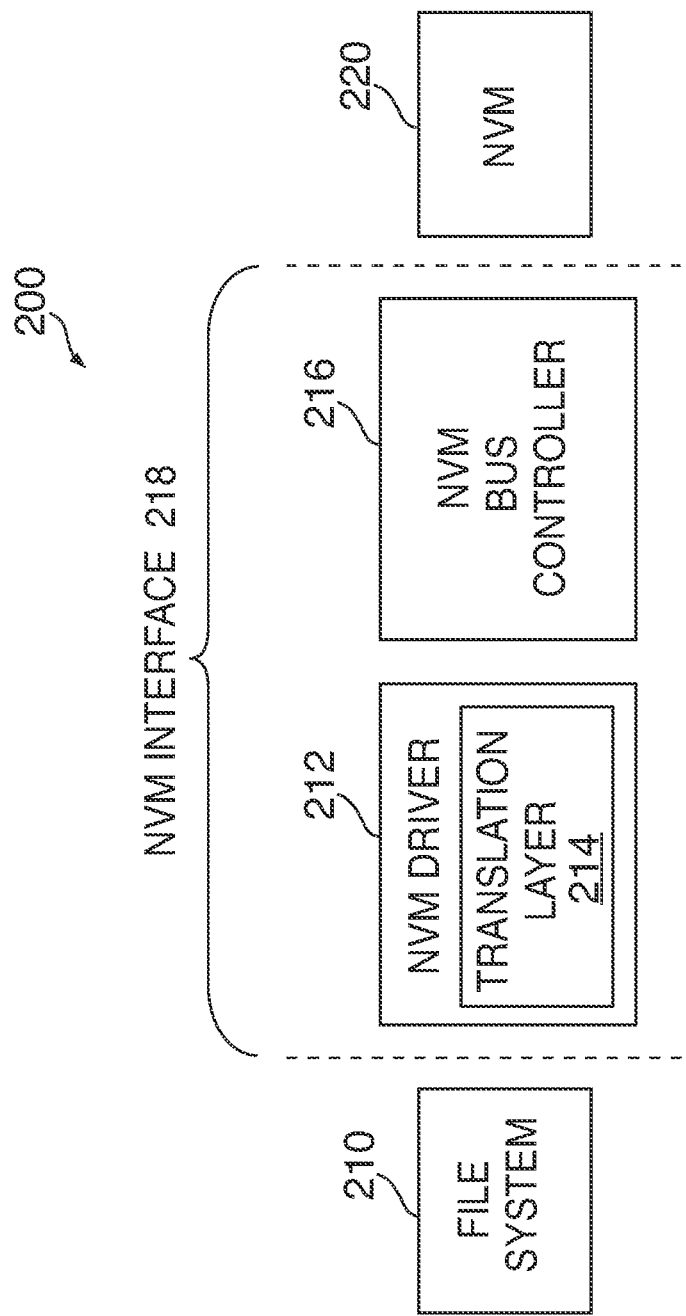

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical-to-physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read requests to NVM driver 212 when the application or operating system requests that information be read from or stored in NVM 220. Along with each read or write request, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write request, translation layer 214 can map the provided logical address to a free, erased physical location on NVM 220. On a read request, translation layer 214 can use the provided logical address to determine the physical address at which the requested data is stored. Because each NVM may have a different layout depending on the size or vendor of the NVM, this mapping operation may be memory and/or vendor-specific.

In addition to logical-to-physical address mapping, translation layer 214 can perform any other suitable functions that may be typical of flash translation layers, such as garbage collection ("GC") and wear leveling.

In some embodiments, NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, ECC data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate table maintaining the physical-to-logical mapping in NVM 220 becomes outdated, NVM interface 218 may still determine the proper mapping at power-up or reboot of electronic device 200, for example.

Figure 3:
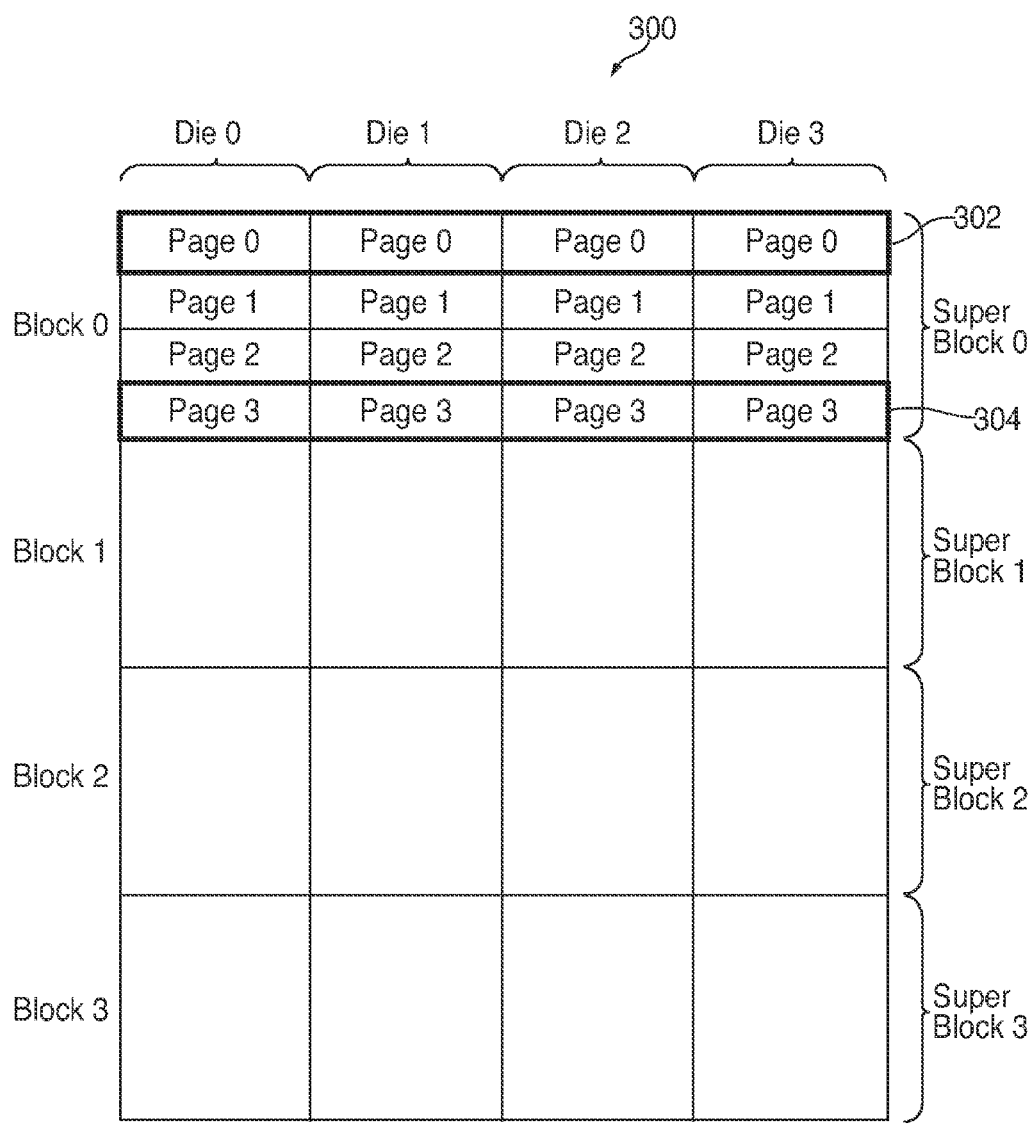
FIG. 3 is a functional view of a non-volatile memory in accordance with various embodiments of the invention.

As discussed above, a NVM (e.g., NVM 120 of FIG. 1 or NVM 220 of FIG. 2) can be organized into dies, blocks, pages, super blocks, and the like. For example, FIG. 3 shows a functional view of NVM 300. NVM 300 can be the same as or similar to NVM 120 (FIG. 1) or NVM 220 (FIG. 2). FIG. 3 is merely meant to illustrate the organizational layout of NVM 300 and does not indicate an actual, physical layout of the non-volatile memory. For instance, although die 0 is illustrated as being next to die 1 in FIG. 3, this is merely for illustrating the functional relationship of these dies, and in the actual, physical layout of NVM 300, these dies may or may not be located near one another.

Moreover, although a certain number of dies, blocks, and pages are shown in FIG. 3, this is merely for the purpose of illustration and one skilled in the art could appreciate that NVM 300 could include any suitable number of dies, blocks, and pages.

As illustrated by FIG. 3, NVM 300 can include one or more dies (i.e., integrated circuits), such as die 0, die 1, die 2, and die 3. Each die of NVM 300 may be organized into one or more "blocks". For example, dies 0-3 are illustrated as each being organized into blocks 0-3.

Each block of the dies may further be organized into one or more pages. For example, block 0 of each of dies 0-3 is illustrated as being organized into pages 0-3. Each page of NVM 300 can include any suitable information. For example, the pages can include user data, metadata, or both. In some embodiments, metadata such as ECC data can be included in the pages to provide for error detection and/or correction of the information stored in NVM 300.

NVM 300 can also include one or more super blocks that include one block from each die that has the same position or "block number" in the die. For example, super block 0 of NVM 300 can include block 0 of each of dies 0-3. Similarly, super block 1 of NVM 300 can include block 1 of each of dies 0-3, super block 2 of NVM 300 can include block 2 of each of dies 0-3, and so forth.

Super blocks can be formed by virtually linking or "striping" together one or more blocks. Blocks need not be in the same row of each die to be virtually linked as a super block. In fact, blocks may be chosen randomly from two or more dies to form a super block. In some embodiments, a super block can include only one block. Super blocks provide operational parallelism, thereby enabling programming, reading, and erase operations to be performed in parallel for blocks located in different dies.

In addition, pages from two or more dies may be virtually linked together to form super pages or "stripes". For instance, stripe 302 can include page 0 from block 0 of each of dies 0-3. Similarly, stripe 304 can include page 3 from block 0 of each of dies 0-3. A translation layer (e.g., translation layer 214 of FIG. 2) being implemented in an NVM interface may keep track of super blocks or stripes.

A block of NVM 300 may be a multi-level cell ("MLC") block that includes both upper and lower pages. For a MLC block, the accessing time (e.g., the reading and programming time) can remain the same for pages that are included in a particular stripe (e.g., stripe 302 or 304). That is, when an entire stripe is being programmed, lower pages of the stripe can be programmed first, followed by upper pages. In contrast, if the data being programmed is not aligned with a stripe boundary, lower and upper pages may be programmed in an alternating order. In other words, there is a bi-modalism to the programming order.

Accordingly, because upper page programming typically takes a longer period of time than lower page programming, it is advantageous for a device to program pages along one or more stripe-boundaries. This avoids the bi-modalism present in non-stripe-aligned programming.

Figure 4:
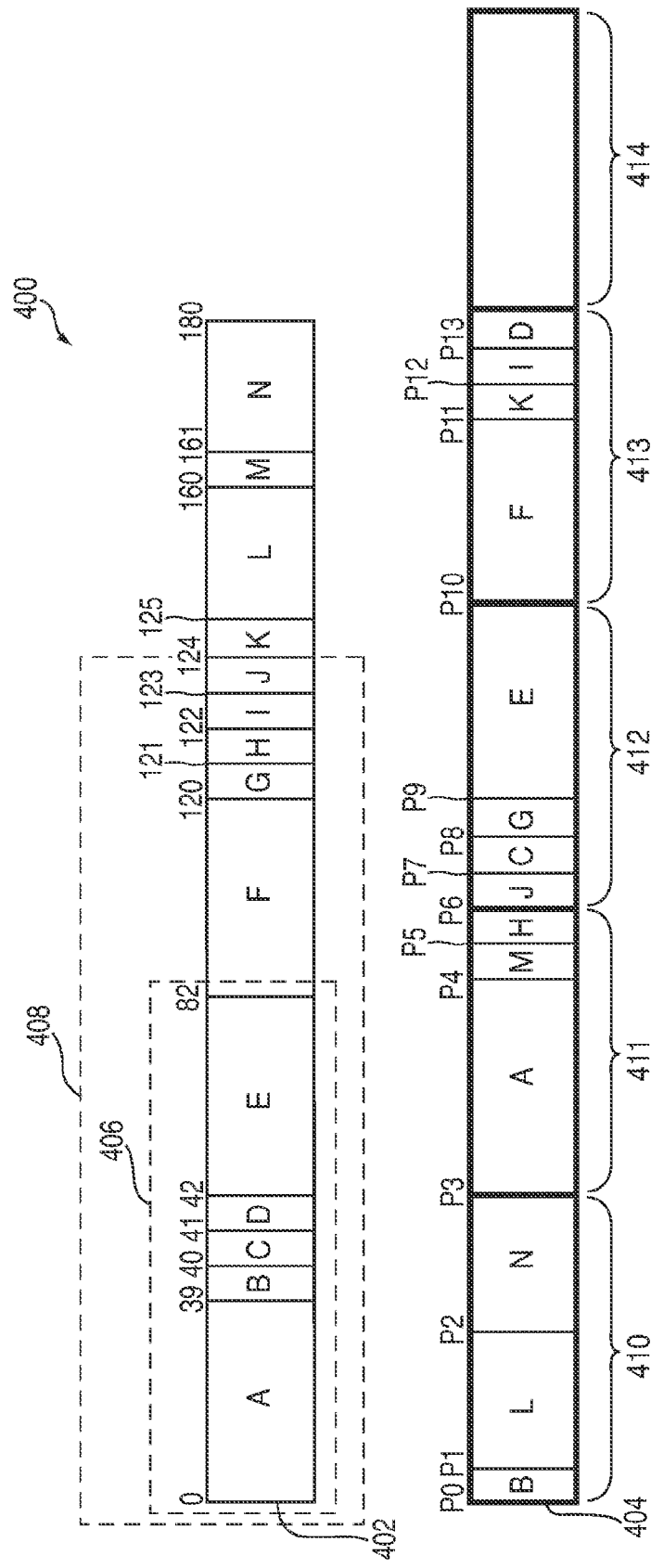
FIG. 4 is a block diagram of an illustrative mapping of logical block addresses to physical pages in accordance with various embodiments of the invention.

Referring now to FIG. 4, a block diagram illustrating a mapping 400 of logical block addresses 402 to physical pages 404 is shown. Logical block addresses 402 can correspond to a logical space.

A file system (e.g., file system 210 of FIG. 2) can allocate any suitable number of LBAs to a file. For instance, as shown in FIG. 4, LBAs 402 can correspond to files A-N, where each of the files A-N is allocated one or more LBAs. For example, file A is allocated LBAs 0-38, file B is allocated LBA 39, file C is allocated LBA 40, and so on.

In addition, LBAs may be used by the file system to reference data stored in one or more physical addresses of a NVM (e.g., NVM 120 of FIG. 1, NVM 220 of FIG. 2, or NVM 300 of FIG. 3). For instance, as shown in FIG. 4, the NVM can include super blocks 410-414, which can include pages 404. Each one of LBAs 402 can map to a page of pages 404. Accordingly, each LBA can map to the physical address of a corresponding page. As shown in FIG. 4, for instance, the starting LBA for file A maps to physical address P3, the starting LBA of file B maps to physical address P0, and so on.

Figure 5:
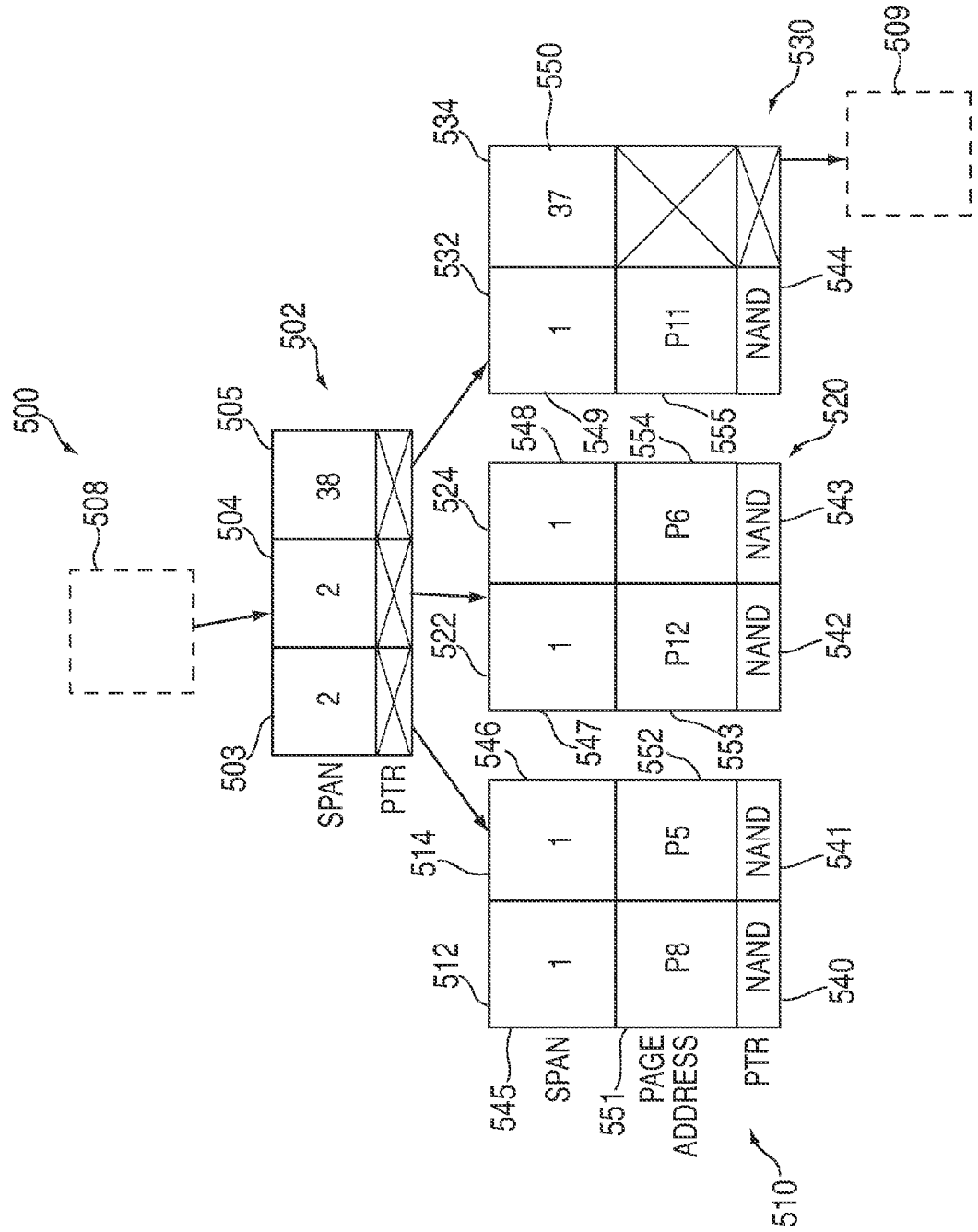
FIG. 5 is a block diagram of a portion of an illustrative tree used for providing logical-to-physical mappings in accordance with various embodiments of the invention.

FIG. 5 shows a block diagram of a portion of tree 500, which may be used to provide logical-to-physical mappings. In particular, tree 500 can provide a mapping between LBAs (e.g., LBAs 402 of FIG. 4) and corresponding physical addresses (e.g., physical addresses of pages 404 of FIG. 4) of a NVM (e.g., NVM 120 of FIG. 1, NVM 220 of FIG. 2, or NVM 300 of FIG. 3). As discussed previously, tree 500 can be stored and maintained in volatile memory (e.g., memory 114 of FIG. 1).

Tree 500 can include multiple nodes, where each node may be consistently sized for memory allocation purposes (e.g., each node may have a fixed size of 64 bytes). In addition, each node of tree 500 can include one or more entries. For example, as shown in FIG. 5, node 502 can include three entries (e.g., entries 503-505). For the sake of simplicity, FIG. 5 shows only a portion of tree 500. Thus, dashed boxes 508 and 509 can represent additional nodes and entries that are not illustrated in FIG. 5.

Each entry of a node can correspond to a span (e.g., a logical size or a number of logical addresses of the entry), and can include either a pointer to another node ("a node pointer") or a physical address of the NVM ("a NAND pointer"). In some cases, the span can correspond to a run-length encoding compressed ("rle-compressed") range. For instance, as shown in FIG. 5, entries 503-505 are shown to correspond to spans 2, 2, and 38, respectively.

Moreover, as shown in FIG. 5, each of entries 503-505 can have node pointers that point to additional nodes in the tree. In particular, entry 503 is shown as pointing to node 510, which in turn includes two entries (e.g., entries 512 and 514). Likewise, entry 504 is shown as pointing to node 520, which includes two entries (e.g., entries 522 and 524). Finally, entry 505 is shown as pointing to node 530, which includes two entries (e.g., entries 532 and 534).

Because spans are stored in tree 500 instead of LBAs, a NVM interface (e.g., NVM interface 118 of FIG. 1 or NVM interface 218 of FIG. 2) can traverse tree 500 from a top node to the bottom nodes in order to obtain a logical-to-physical mapping of a particular file. For example, based on the LBAs assigned to a file, the NVM interface can increment an address tally as it expands from the top node of tree 500 until the resulting address tally matches the LBAs of the file. Persons skilled in the art will appreciate that tree 500 can have any suitable tree structure. In some cases, tree 500 can have a tree structure that improves the retrieval time for a particular entry such as, for example, a b-tree or a b*-tree. Persons skilled in the art will appreciate that any other suitable component(s) of a system (e.g., electronic device 100 of FIG. 1 or electronic device 200 of FIG. 2) can instead maintain tree 500. For example, tree 500 can be maintained by a software layer implemented on top of the NVM interface and/or control circuitry (e.g., control circuitry 112 of FIG. 1).

Moreover, by storing spans instead of LBAs, more entries and pointers (e.g., node and NAND pointers) can be included in each node of tree 500. For example, if each node of tree 500 is allocated 64 bytes and each entry is then allocated between 4 to 6 bytes, each node of tree 500 may be capable of storing between 10 and 16 entries (e.g., pointers).

Entries 512, 514, 522, 524, and 532 can include NAND pointers 540-544 and spans 545-549, respectively. In addition, entries 512, 514, 522, 524, and 532 can include page addresses 551-555, respectively. Each of page addresses 551-555 can provide the starting page address of the corresponding entry. For instance, as shown in FIG. 5, entry 512 can correspond to file G (FIG. 4), and consequently may have span 545 of 1 and page address 551 of P8. Similarly, each of entries 514, 522, 524, and 532 can correspond to files H-K, respectively.

When a relatively large file is programmed sequentially to a NVM (e.g., a media file, an application, or a system file), data corresponding to a particular file can be stored into the same super block or the same set of super blocks (e.g., super blocks 0-3 of FIG. 3). Consequently, the file can be both logically and physical contiguous (e.g., the file can be associated with a set of contiguous logical addresses and a corresponding set of contiguous physical addresses). The file can thus be represented by a single entry in a tree (e.g., a single NAND pointer).

In some cases, a file system can also issue small random writes (e.g., data associated with multiple small files). These writes, which can be logically contiguous, may be scattered across multiple super blocks. Each of the multiple data fragments in the NVM may therefore need to be represented by a separate individual entry in the tree. For instance, each of files H-K is represented by a separate entry in tree 500 (e.g., one of entries 512, 514, 522, 524, and 532).

Due to the space limitations of volatile memory, a fixed amount of memory space (e.g., a tree memory pool of 1 MB or 100 MB) may be allocated for tree 500. Eventually, the tree memory pool may be depleted to a point where logical-to-physical mapping can no longer be saved for additional data fragments.

Hence, in order to free up additional memory for the tree memory pool, the NVM interface can attempt to reduce the number of data fragments in the NVM, thereby flattening a portion of the tree. The amount of memory that is freed up can be added back to the tree memory pool. For example, in response to receiving a write request from the file system, the NVM interface can select to flatten at least a portion of the tree. In one embodiment, the NVM interface can call a tree flattener function.

The NVM interface may flatten a portion of the tree by, for instance, combining multiple entries of the tree into a single entry or node. These multiple entries can be contiguous in the logical space but may be programmed non-contiguously in the physical space. That is, they may correspond to data fragments that are randomly distributed in various super blocks of the NVM. Accordingly, by re-programming the data corresponding to the entries contiguously to a new super block, the NVM interface can ensure that the data fragments are both physically and logically contiguous.

In general, because flattening a portion of the tree requires programming operations that are neither requested by a user or a file system, flattening operations can increase the overall write amplification of the system. As used herein, "write amplification" can refer to a ratio between file system requests and physical accesses of the NVM. An increase in write amplification can result in poor system performance, leading to increased wear on the NVM and increased system power requirements.

Therefore, tree flattening operations should be invoked only when it is necessary. For example, a tree flattening function may be invoked only when the amount of memory available for a tree is below a pre-determined threshold. The pre-determined threshold can be any suitable number corresponding to a point of near exhaustion of the tree memory pool (e.g., the total amount of memory allocated for the tree) such as, for example, 2% of the tree memory pool. That is, the condition is satisfied if the amount of memory available is 1% of the tree memory pool, which is less than the pre-determined threshold of 2% of the tree memory pool.

Using such an approach, the NVM interface can avoid unnecessarily burdening the device. In particular, if the memory usage of a tree does not exhaust the tree memory pool, a flattening operation is not necessary. Moreover, by waiting to flatten the tree, the number of candidate tree entries that can be flattened may increase. The NVM interface therefore has a higher probability of locating an optimal set of entries for flattening (e.g., entries that produce an optimal tradeoff between write amplification and memory usage).

The NVM interface can use any suitable approach to locate entries of a tree to combine. For example, the NVM interface can move a sliding window across the tree. In some embodiments, the sliding window can be a list having elements that correspond to entries of the tree. Thus, as the NVM interface moves the sliding window across the tree, new entries can be added to the list.

While the NVM interface is moving the sliding window across the tree, the NVM interface can also maintain a running counter that indicates the span of the entries currently encompassed by the sliding window. For example, referring back to FIG. 4, the NVM interface can move sliding window 406 across a tree associated with LBAs 402. Initially, a running counter can have a value of zero, and sliding window 406 can encompass files A-E. Persons skilled in the art will appreciate that sliding window 406 may be configured to encompass any suitable number of entries (e.g., 32 entries). However, sliding window 406 is shown in FIG. 4 to encompass five entries (e.g., files) merely for the sake of simplicity.

The NVM interface can add the size of logical space corresponding to the encompassed entries to the running counter. That is, the NVM interface can add the total span of entries corresponding to files A-E (e.g., a total span of 82) to the running counter. The NVM interface can then compare the current value of the running counter to a minimum span that is stored in memory. For example, the minimum span can initially be set to the largest value that can fit in a 32-bit counter.

If the current value of the running counter is smaller than the minimum span, the NVM interface can replace the current value of the running counter as the minimum span. In addition, the NVM interface can store the starting LBA of the sliding window in memory. For files A-E (FIG. 4), for instance, the NVM interface can save 82 as the minimum span and 0 as the starting LBA. In contrast, if the current value is greater than the minimum span, the NVM interface can keep the values of the minimum span and the starting LBA that are stored in memory.

The NVM interface can then move sliding window 406 by a single entry (e.g., one file), such that sliding window 406 now encompasses files B-F. The NVM interface can then add the size of the new entry encompassed by sliding window 406 (file F) to the running counter, and subtract the size of the entry that is no longer encompassed by sliding window 406 (file A) from the running counter. As shown in FIG. 4, the span of the entry corresponding to file F is 38, and the span of the entry corresponding to file A is 39. Hence, the resulting value of the running counter is 84 (82+38−39=81).

The NVM interface can then detect whether the current value of the running counter is less than the minimum span. Because the current value of the running counter (e.g., 81) is less than the minimum span saved in memory (e.g. 82), the NVM interface can replace the running counter as the minimum span. In addition, the NVM interface can update the starting LBA saved in memory (e.g., 0) with the current starting LBA (e.g., 39).

The NVM interface may then continue moving the sliding window through consecutive entries of the tree, and may continue updating the running counter accordingly (e.g., by adding the span of the entry newly encompassed by sliding window 406, and subtracting the span of the entry no longer encompassed by sliding window 406). Then, based on a comparison between the current value of the running counter to the minimum span, the NVM interface can either replace or keep the minimum span and the starting LBA stored in memory. Once the sliding window has finished moving across the tree, the NVM interface can combine an optimal set of entries of the tree that corresponds to the minimum span.

Ideally, the optimal set of entries can have a span equal to the number of entries in the set. In other words, the optimal set of entries will correspond to a set of files with consecutive LBAs, where each entry has a minimum LBA size (e.g., a LBA of one). For example, for LBAs 402 of FIG. 4, a set of entries corresponding to files G-K will be optimal for sliding window 406 (e.g., entries 512, 514, 522, 524, and 532 of FIG. 5). As another example, if a sliding window encompasses 32 entries, an optimal set of entries for the sliding window can be 32 logically consecutive entries that are a single sector each (e.g., one LBA each).

After obtaining the optimal set of entries, the NVM interface can select to reprogram data fragments corresponding to the entries such that the fragments can be physically contiguous. For example, the NVM interface can read data corresponding to the set of entries from the NVM, and then saving the data in volatile memory (e.g., in a memory buffer). After saving the data, the NVM interface can program the data sequentially to a new super block of the NVM, and flatten the entries in the tree (e.g., combine the set of entries into a single node or entry). For example, if there are 32 entries that are each a single LBA in size and if each LBA is 4K, the NVM interface may need to reprogram data of size 128K in the NVM.

Figure 6:
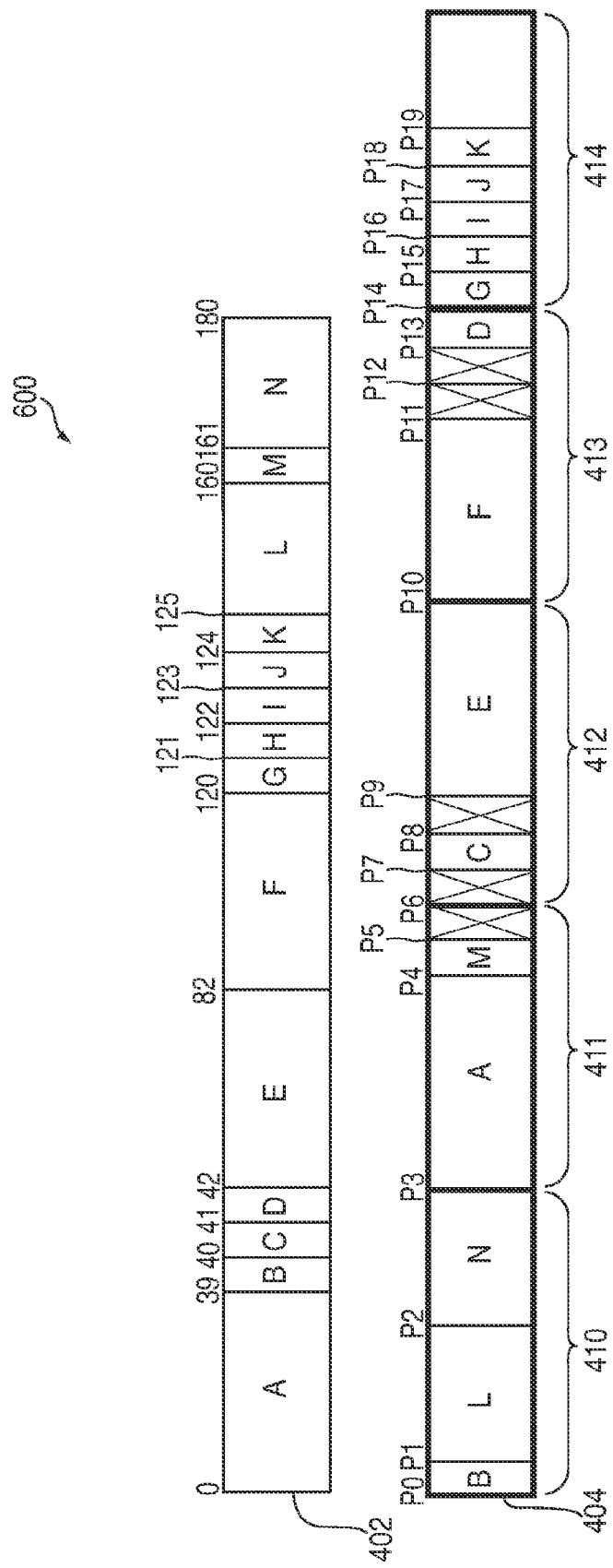
FIG. 6 is a block diagram of another illustrative mapping of logical block addresses to physical pages in accordance with various embodiments of the invention.

Turning now to FIG. 6, a block diagram of mapping 600 of logical block addresses to physical pages is shown. As shown in FIG. 6, the data corresponding to files G-K have been re-programmed sequentially to super block 414. The previous physical addresses of the files have been marked as invalid (shown by the crossed-out boxes in FIG. 6).

In addition, a tree providing the logical-to-physical mapping can be updated. For example, referring to FIG. 7, a block diagram of a portion of updated tree 700 is shown. In particular, a NVM interface can combine a set of entries (e.g., entries 512, 514, 522, 524, and 532 of FIG. 5) into a single node 702. Persons skilled in the art will appreciate that the set of entries may be combined into a node or an entry. For example, the set of entries can be combined into either a node or entry based on the size of the total span of the set of entries and/or the size allocated to a node or entry.

Figure 7:
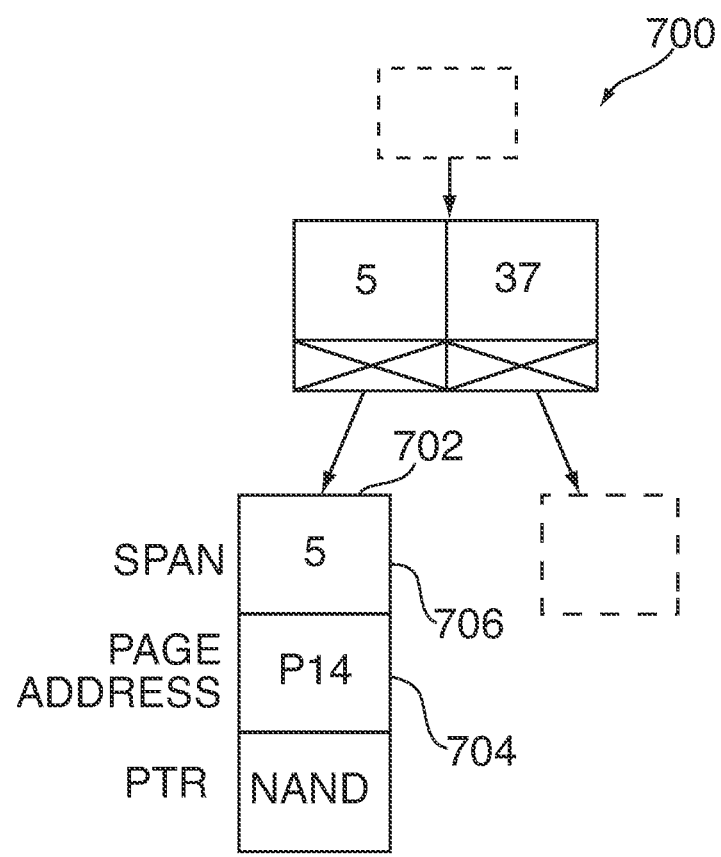
FIG. 7 is a block diagram of a portion of another illustrative tree used for providing logical-to-physical mappings in accordance with various embodiments of the invention.

As shown in FIG. 7, page address 704 for the combined set of entries is at P14, and total span 706 is 5. In order to access one of the LBAs 120-124 (FIG. 6), the NVM interface can calculate a LBA offset using span 706. For example, by traversing updated tree 702, the NVM interface can determine that the LBA base for the span is 120. Based on the LBA base, the NVM interface can determine the LBA offset that corresponds to the LBA to be accessed (e.g., by subtracting the LBA base from the LBA to be accessed). The NVM interface can then add the LBA offset to the starting page address in order to access the corresponding physical address in the NVM.

For instance, in order to access LBA 122, the NVM interface can determine that there is a LBA offset of 2 (e.g., 122−120=2). The NVM interface can then add the LBA offset of 2 to starting page address 704 of P14 to obtain a corresponding physical address of P16. This is the physical page address of LBA 122.

In other embodiments, upon determining that an optimal set of entries have been located while scanning the tree, the NVM interface can stop moving the sliding window across the tree. For example, referring back to FIG. 4, upon moving sliding window 406 to encompass files G-K, the NVM interface can determine that entries corresponding to files G-K are optimal for sliding window 406 (e.g., each one of the entries has a LBA of one). The NVM interface can then select to flatten entries of the tree without having to wait for the sliding window to finish moving across the tree.

Figure 8:
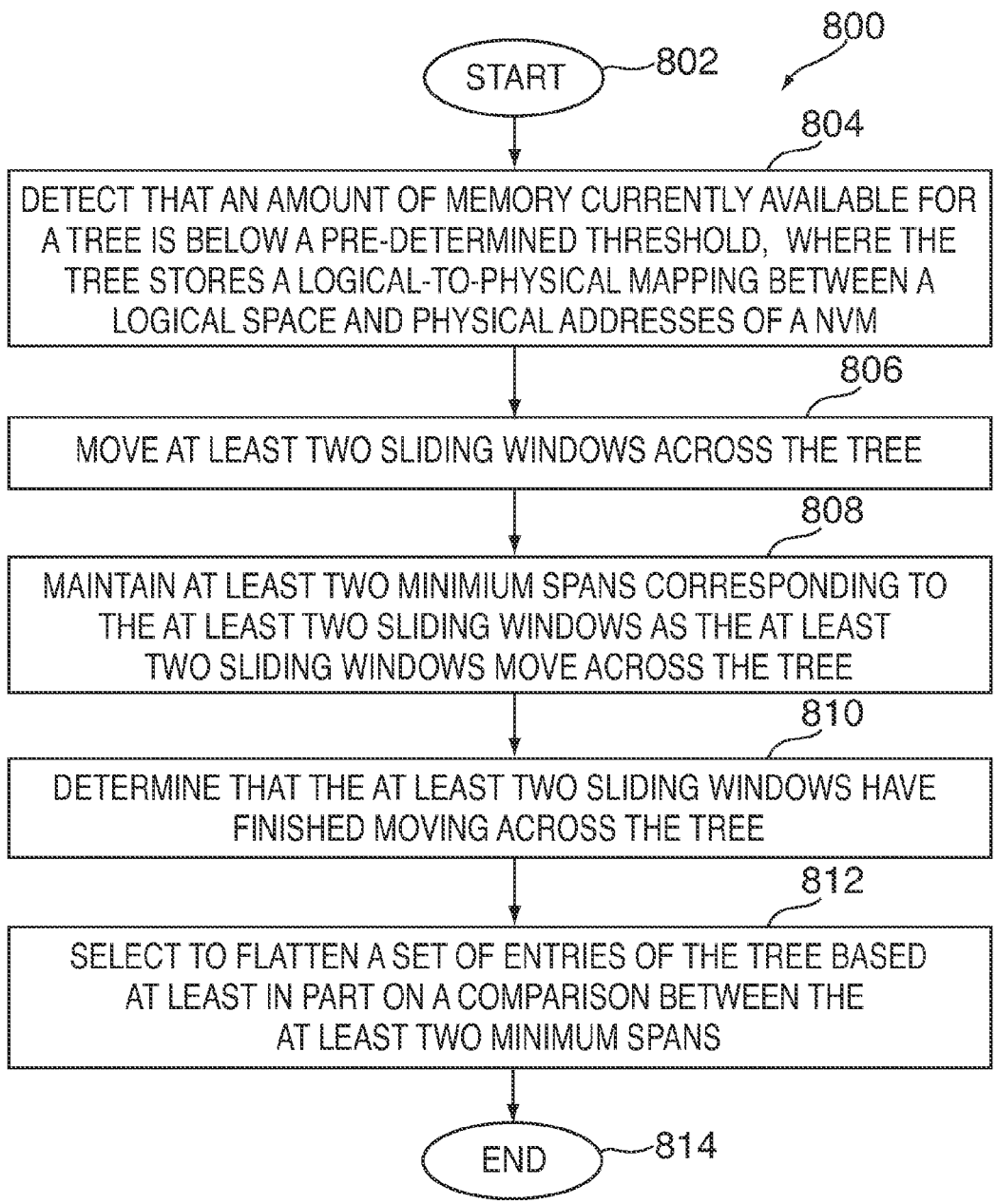
FIG. 8 is a flowchart of an illustrative process for faster tree flattening in accordance with various embodiments of the invention.
Figure 9:
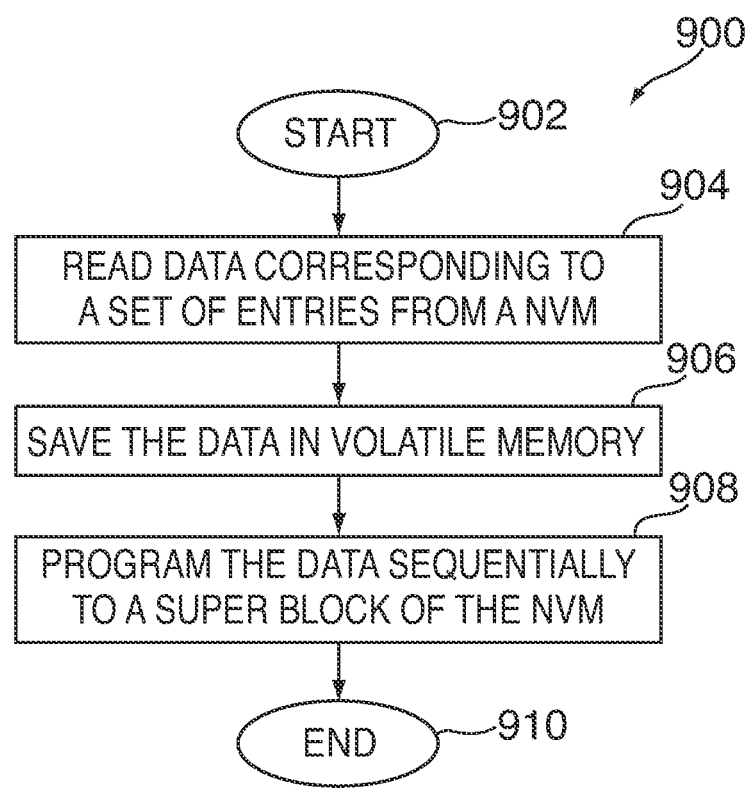
FIG. 9 is a flowchart of an illustrative process for generating physically contiguous fragments in a non-volatile memory in accordance with various embodiments of the invention.

In further embodiments, the NVM interface can use multiple sliding windows to obtain an optimal set of entries. Turning now to FIGS. 8 and 9, flowcharts of illustrative processes are shown in accordance with various embodiments of the invention.

Turning first to FIG. 8, process 800 is shown for faster tree flattening. Process 800 may begin at step 802, and at step 804, the NVM interface can detect that an amount of memory currently available for a tree (e.g., tree 500 of FIG. 5) is below a pre-determined threshold, where the tree can store a logical-to-physical mapping between a logical space and physical addresses of a NVM (e.g., NVM 120 of FIG. 1, NVM 220 of FIG. 2, or NVM 300 of FIG. 3).

At step 806, the NVM interface can move at least two sliding windows (e.g., sliding windows 406 and 408 of FIG. 4) across the tree. The at least two sliding windows can have different sizes. That is, each sliding window can encompass a different number of entries of the tree. For example, a first sliding window can be configured to encompass 32 entries of the tree, and a second sliding window can be configured to encompass 128 entries of the tree.

By using sliding windows with different sizes, a more optimal set of entries can be located in the tree as compared to using only one sliding window. In particular, due to file system allocation policies, similarly-sized files may be adjacent in logical space. Thus, if there are several entries with a span of one, it is likely that a new entry adjacent to these entries also has a span of one. In such cases, a larger sliding window may capture entries that are more optimal as compared to a smaller sliding window. On the other hand, if a sliding window is too large, there is also a higher probability that some of the entries that fit within the sliding window may not be entries with minimal span.

Persons skilled in the art will appreciate that any suitable number of sliding windows can be used (e.g., 2, 3, 4, etc.). Persons skilled in the art will also appreciate that the at least two sliding windows may be configured to encompass any suitable number of entries. For the sake of simplicity, however, sliding windows 406 and 408 are shown in FIG. 4 to encompass five and ten entries (e.g., files), respectively.

In some embodiments, the at least two sliding windows can move across the tree consecutively. In other embodiments, in order to improve the speed of the search, the at least two sliding windows can move across the tree in parallel.

Continuing to step 808, the NVM interface can maintain at least two minimum spans corresponding to the at least two sliding windows as the at least two sliding windows move across the tree. For example, for each of the at least two sliding windows, the NVM interface can add a span of an entry newly encompassed by the sliding window to a running counter. The running counter can correspond to the total span of entries of the tree that are encompassed by the sliding window. In addition, the NVM interface can subtract the span of an entry no longer encompassed by the sliding window from the running counter. The current value of the running counter can then be compared to a minimum span saved in volatile memory. Based on the comparison, the NVM interface can either replace or keep the minimum span stored in memory. In addition, the NVM interface can also replace or keep a starting LBA stored in memory. Process 800 may then move to step 810.

At step 810, the NVM interface can determine that the at least two sliding windows have finished moving across the tree. Then, at step 812, the NVM interface can select to flatten a set of entries of the tree based at least in part on a comparison between the at least two minimum spans. For example, the NVM interface can determine which of the at least two minimum spans has a smaller value.

After comparing the at least two minimum spans, the NVM interface can select to flatten a set of entries corresponding to the sliding window with the smaller value. The set of entries can include logically contiguous entries. For instance, referring back to FIGS. 4 and 5, the NVM interface can select entries 512, 514, 522, 523, and 532 (FIG. 5), which correspond to sliding window 406 (FIG. 4). Process 800 may then end at step 814.

Turning now to FIG. 9, a flowchart of an illustrative process is shown for programming physically contiguous data fragments. In some embodiments, process 900 may represent a more detailed view of the selecting to flatten step 812 of process 800 (FIG. 8).

Process 900 may begin at step 902, and at step 904, a NVM interface can read data (e.g., user data) corresponding to a set of entries (e.g., entries 512, 514, 522, 523, and 532 of FIG. 5) from a NVM. For example, referring back to FIG. 4, the NVM interface can read data stored at physical page addresses P8, P5, P12, P6, and P11.

Continuing to step 906, the NVM interface can save the data in volatile memory (e.g., memory 114 of FIG. 1). Process 900 may then move to step 908. At step 908, the NVM interface can program the data sequentially (e.g., in a write stream) to a new super block of the NVM (e.g., super block 414 of FIG. 4). Process 900 may then end at step 910.

In further embodiments, a NVM interface can apply a greedy approach to finding an optimal set of entries to flatten. That is, upon finding an initial optimal set of entries, the NVM interface can continue to search for additional consecutive entries of the tree that may be added to the initial optimal set of entries. These additional entries can sometimes be reprogrammed without incurring additional programming costs.

Figure 10A:
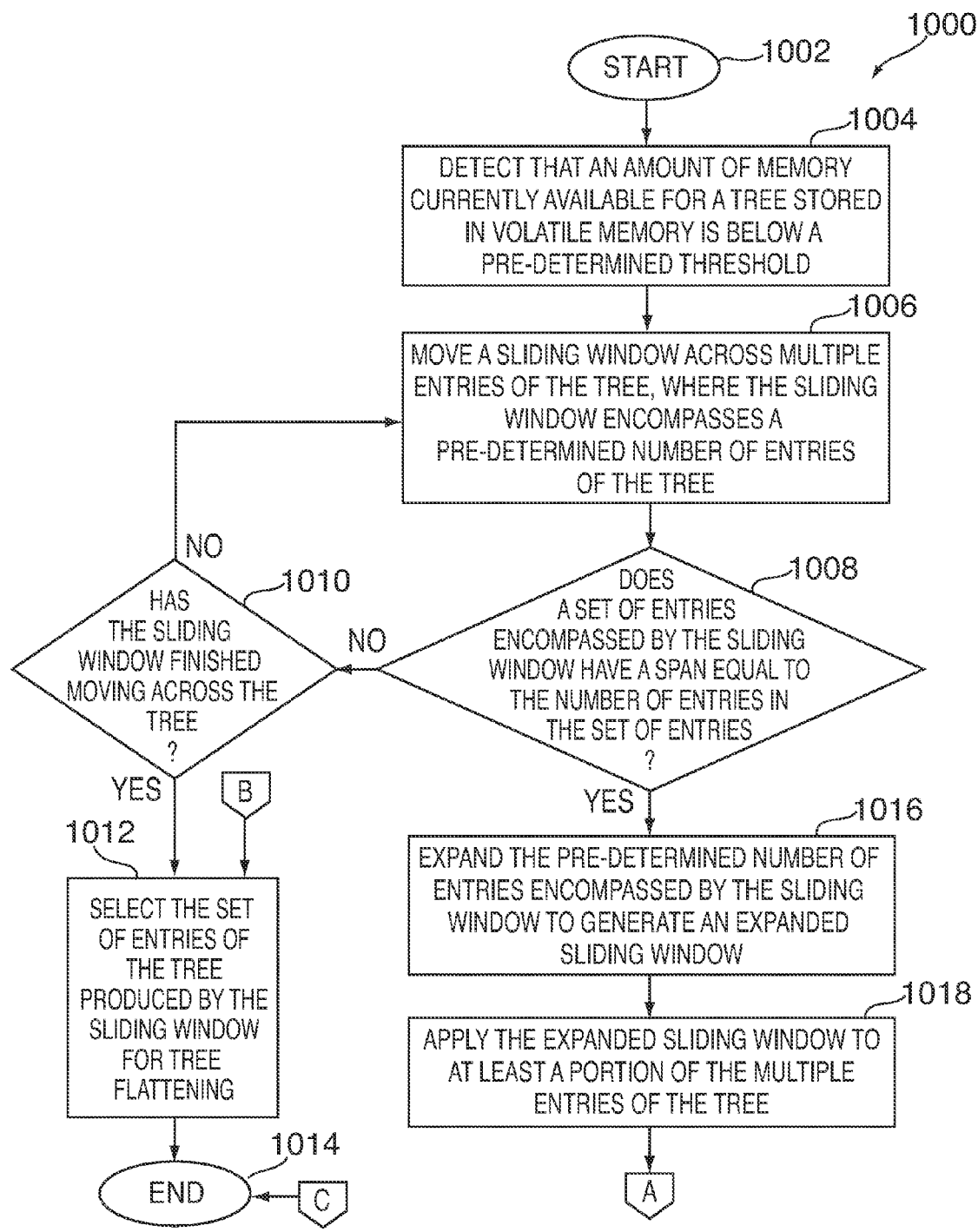
FIGS. 10A and 10B are flowcharts of another illustrative process for faster tree flattening in accordance with various embodiments of the invention.
Figure 10B:
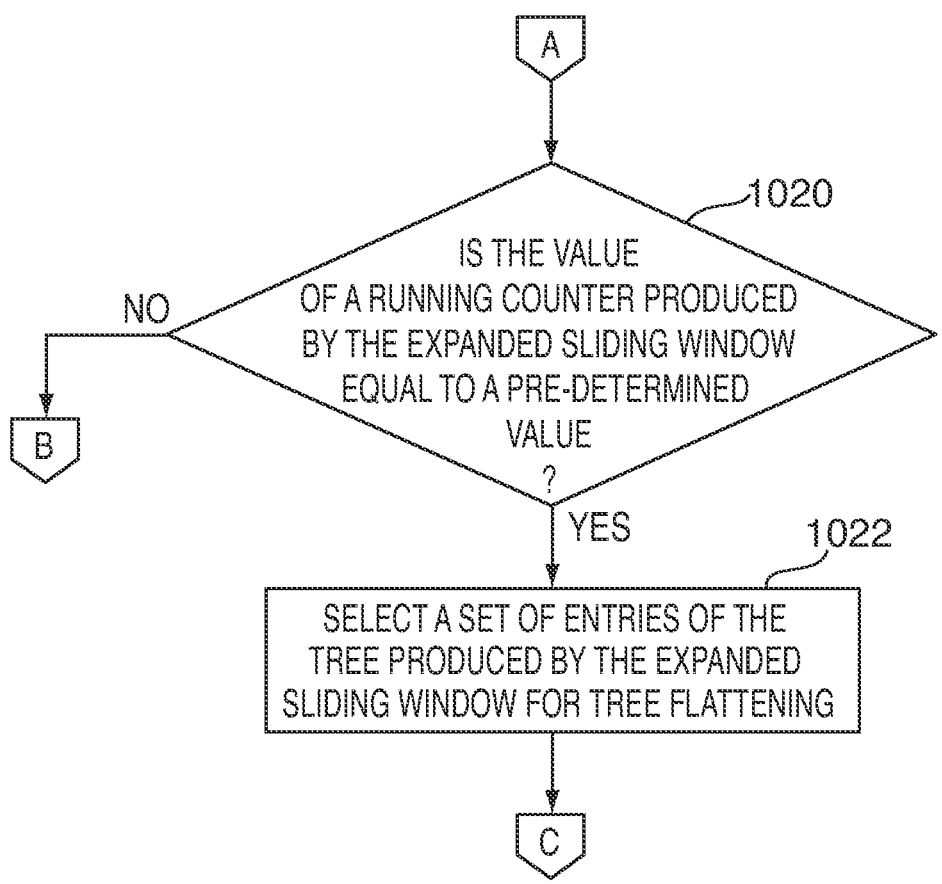

Referring now to FIGS. 10A and 10B, process 1000 is shown for a greedy approach to finding an optimal set of entries to flatten. Process 1000 may begin at step 1002, and at step 1004, a NVM interface (e.g., NVM interface 118 of FIG. 1 or NVM interface 218 of FIG. 2) can detect that an amount of memory currently available for a tree (e.g., tree 500 of FIG. 5) stored in a volatile memory (e.g., memory 114 of FIG. 1) is below a pre-determined threshold.

Then, at step 1006, the NVM interface can move a sliding window (e.g., sliding window 406 of FIG. 4) across multiple entries of the tree, where the sliding window can encompass a pre-determined number of entries of the tree. For example, the sliding window may encompass 32 entries (e.g., equal to the size of a stripe in the NVM).

Continuing to step 1008, the NVM interface can determine whether a set of entries encompassed by the sliding window has a span equal to the number of entries in the set of entries. If, at step 1008, the NVM interface determines that the set of entries encompassed by the sliding window does not have a span equal to the number of entries in the set of entries, process 1000 may move to step 1010.

At step 1010, the NVM interface can determine whether the sliding window has finished moving across the tree. If, at step 1010, the NVM interface determines that the sliding window has finished moving across the tree, process 1000 may move to step 1012.

At step 1012, the NVM interface can select a set of entries of the tree produced by the sliding window for tree flattening. For example, the NVM interface can select a set of entries that correspond to one or more values saved in memory (e.g., a minimum span and a starting LBA). That is, the set of entries may have the smallest span in comparison to other sets of entries in the tree. Process 1000 may then end at step 1014.

If, at step 1010, the NVM interface instead determines that the sliding window has not finished moving across the tree, process 1000 may return to step 1006. At step 1006, the NVM interface can continue to move the sliding window across entries of the trees.

Referring back to step 1008, if the NVM interface instead determines that the set of entries encompassed by the sliding window has a span equal to the number of entries in the set of entries, process 1000 may move to step 1016. In other words, the set of entries may be an optimal set of entries for the current sliding window.

At step 1016, the NVM interface can expand the pre-determined number of entries encompassed by the sliding window to generate an expanded sliding window (e.g., sliding window 408 of FIG. 4). In some cases, if the sliding window previously encompassed 32 entries, the NVM interface can expand the sliding window to encompass 64 entries.

In some embodiments, the NVM interface can attempt to align the span of the set of entries encompassed by the expanded sliding window with a stripe-boundary. For example, referring back to FIG. 3, each stripe (e.g., stripe 302 or 304) may be capable of storing 32 LBAs. If the span of an optimal set of entries encompassed by a sliding window is 32, the NVM interface can expand the pre-determined number of entries of the sliding window by a multiple of the size of a stripe. Consequently, an optimal set of entries encompassed by an expanded sliding window may have a span of 64 LBAs, 96 LBAs, etc.

As another example, if the span of an optimal set of entries encompassed by the sliding window is less than the size of a stripe (e.g., a span of 48 LBAs), the sliding window can be expanded to align with a stripe-boundary. That is, the NVM interface can expand the pre-determined number of entries of the sliding window to 64 entries. As discussed above, because the accessing time remains the same for pages that are included in a particular stripe, the time for programming user data that fills an entire stripe may be the same as the time for programming user data that fills less than a stripe.

As yet another example, the NVM interface can determine how to expand the sliding window based on a current location in a block or super block of the NVM (e.g., super block 414 of FIG. 4). For instance, if a stripe of a super block is currently filled half-way with data, the NVM interface can expand the pre-determined number of entries by half the size of a stripe (e.g., 16 entries).

Then, at step 1018, the NVM interface can apply the expanded sliding window to at least a portion of the multiple entries of the tree. In particular, the NVM interface can search for additional consecutive entries of the tree having small spans (e.g., 1, 2, 3, or 4 LBAs) that can be added to the expanded sliding window. Process 1000 may then move to step 1020.

At step 1020, the NVM interface can determine whether the value of a running counter produced by the expanded sliding window is equal to a pre-determined value. For example, the NVM interface can determine if the value of the running counter (e.g., the total span for a set of entries encompassed by the expanded sliding window) is equal to a multiple of a stripe size.

If, at step 1020, the NVM interface determines that the value of the running counter is not equal to the pre-determined value, process 1000 may move to step 1012. In particular, the NVM interface may have determined that the total span of the set of entries encompassed by the expanded sliding window is less than or greater than the size of one or more stripes. Based on this determination, the original set of entries may be considered more preferable than the set of entries encompassed by the expanded sliding window. At step 1012, the NVM interface can select the set of entries of the tree produced by the sliding window for tree flattening.

Referring back to step 1020, if the NVM interface instead determines that the value of the running counter is equal to the pre-determined value, process 1000 may move to step 1022. At step 1022, the NVM interface can select a set of entries of the tree produced by the expanded sliding window for tree flattening. Process 1000 may then end at step 1014.

In further embodiments, instead of locating a single optimal set of entries that can be combined in a tree, a NVM interface can find multiple candidate sets of entries on a single pass through the tree. In particular, rather than maintaining a single running counter along with a minimum span and a starting LBA, the NVM interface can maintain a priority queue in volatile memory.

The NVM interface can attempt to insert parameters associated with multiple entries encompassed by a sliding window in a priority queue. The NVM interface can then move the sliding window forward in the tree by a number of entries, where the number of entries is based at least in part on a current state of the priority queue. Once the sliding window has finished moving across the tree, the NVM interface can locate an optimal set of entries using the priority queue.

As used herein, a "priority queue" can be any suitable data structure (e.g., an ordered list) that includes one or more data items, where each data item can be associated with a priority number. For example, a minimum priority queue may be a list where elements with lower priority numbers can move to the front of the list, and elements with higher priority numbers can move to the end of the list. As another example, a maximum priority queue may be a list where elements with higher priority numbers can move towards the front of the list, and elements with lower priority numbers can move to the end of the list.

Figure 11:
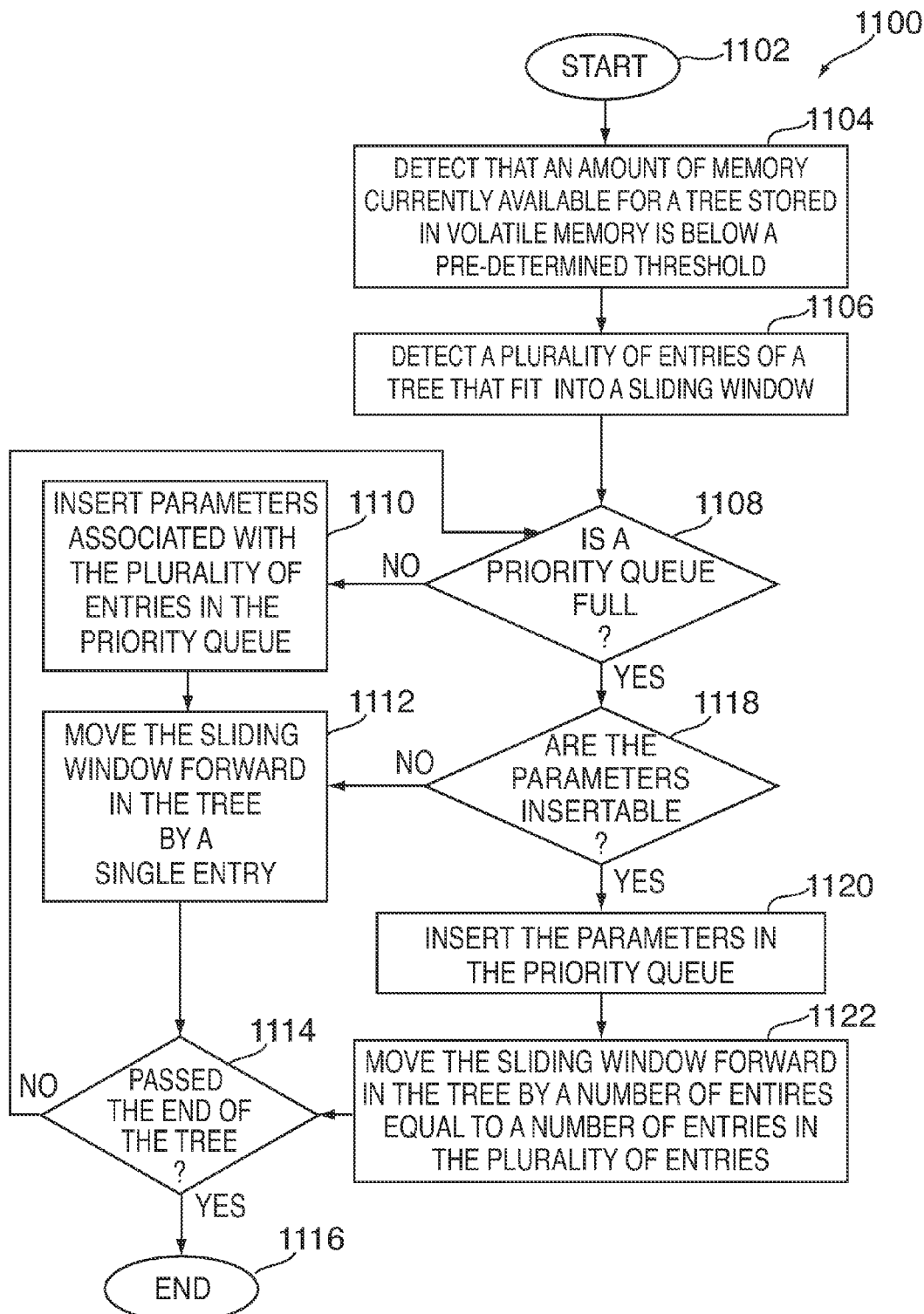
FIG. 11 is a flowchart of yet another illustrative process for faster tree flattening in accordance with various embodiments of the invention.

Referring now to FIG. 11, a flowchart of process 1100 for flattening a tree using a priority queue is shown. Process 1100 may begin at step 1102, and at step 1104, the NVM interface (e.g., NVM interface 118 of FIG. 1 or NVM interface 218 of FIG. 2) can detect that an amount of memory currently available for a tree (e.g., tree 500 of FIG. 5) stored in a volatile memory (e.g., memory 114 of FIG. 1) is below a pre-determined threshold.

At step 1106, the NVM interface can detect a plurality of entries of a tree (e.g., entries corresponding to files A-E of FIG. 4) that fit into a sliding window (e.g., sliding window 406 of FIG. 4). After detecting the plurality of entries, process 1100 may move to step 1108.

At step 1108, the NVM interface can determine if a priority queue is full. For example, the priority queue may have a fixed size (e.g., 20 elements), and can be initialized to a set of empty values. If the priority queue is not full (e.g., there are less than 20 elements in the priority queue), process 1100 may move to step 1110.

At step 1110, the NVM interface can insert parameters associated with the plurality of entries in the priority queue. The parameters that can be added to the priority queue can include a total span and a starting LBA associated with the plurality of entries.

For instance, for files A-E (FIG. 4), the NVM interface can insert the associated parameters as a first element in the priority queue. In particular, the NVM interface can insert a starting LBA of 0 as the data item, and a total span of 82 (82−0=82) as the associated priority number.

Persons skilled in the art will appreciate that other suitable parameters can instead or in addition be included in a priority queue. For example, if a sliding window encompasses a constant number of entries as it moves across the tree, the span can be saved in the priority queue. However, if a sliding window encompasses a variable number of entries as it moves across the tree, a ratio (e.g., a ratio between the total span of the plurality of entries and the number of entries in the plurality of entries) can instead be saved in the priority queue.

Then, at step 1112, the NVM interface can move the sliding window forward in the tree by a single entry. For example, referring to FIG. 4, the NVM interface can move sliding window 406 to encompass entries corresponding to files B-F.

Continuing to step 1114, the NVM interface can determine whether the sliding window has passed the end of the tree. If, at step 1114, the NVM interface determines that the sliding window has not passed the end of the tree, process 1100 may return to step 1108, where the NVM interface can attempt to insert parameters associated with the updated entries (e.g., entries corresponding to files B-F) in the priority queue.

If, at step 1114, the NVM interface instead determines that the sliding window has passed the end of the tree, process 1100 may end at step 1116.

Referring back to step 1108, if the NVM interface instead determines that the priority queue is full (e.g., there are already 20 elements in the priority queue), process 1100 may move to step 1118.

Figure 12:
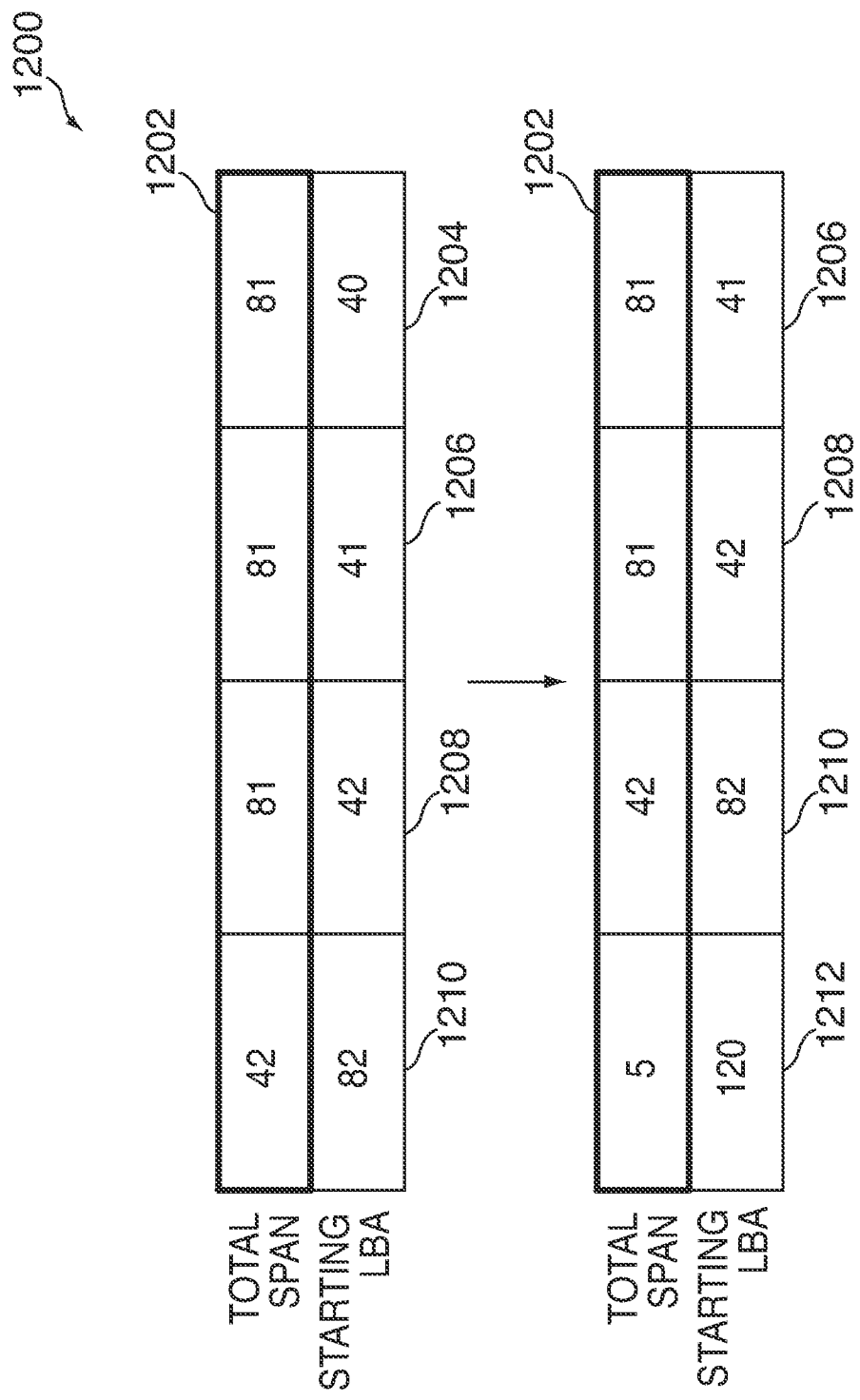
FIG. 12 is a block diagram of a priority queue in accordance with various embodiments of the invention.

For example, referring to FIG. 12, a block diagram 1200 of priority queue 1202 is shown. Priority queue 1202 can include four elements 1204-1210, where each element can correspond to files C-G, D-H, E-I, and F-J (FIG. 4), respectively. Persons skilled in the art will appreciate that priority queue 1202 can include any suitable number of elements. For the sake of simplicity, however, priority queue 1202 is shown to include four elements. As such, priority queue 1202 is full.

Each of elements 1204-1210 can be associated with a total span and a starting LBA. The total span can function as the priority number. As shown, priority queue 1202 can be a minimum priority queue, such that elements are sorted in ascending order based on the total span. Consequently, the element with the lowest priority number (e.g., the lowest total span) can be moved to the front of the queue. New elements can be inserted into priority queue 1202 based on their associated total spans.

Referring back to FIG. 11, at step 1118, the NVM interface can determine whether the parameters associated with the plurality of entries are insertable. For example, if sliding window 406 (FIG. 4) currently encompasses a plurality of entries corresponding to files G-K, the NVM interface can determine whether parameters associated with entries 512, 514, 522, 524, and 532 are insertable in priority queue 1202 (FIG. 12).

In particular, the total span of the plurality of entries can be compared with the total spans that are already stored in the priority queue. If the total span is less than the highest total span in priority queue 1202, the parameters can be inserted in an appropriate location in queue 1202. For example, because the total span corresponding to files G-K (e.g., 5) is less than the highest total span in priority queue 1202 (e.g., 81), the NVM interface can determine that the parameters associated with entries 512, 514, 522, 524, and 532 are insertable. Alternatively, if the total span is greater than the highest total span in priority queue 1202, the NVM interface can discard the parameters.

If the NVM interface determines that the parameters are insertable, process 1100 may move to step 1120. At step 1120, the NVM interface can insert the parameters into the priority queue. For example, the total span of 5 and the starting LBA of 120 of files G-K (FIG. 4) can be inserted as element 1212 in priority queue 1202 (FIG. 12). In addition, because priority queue 1202 has a fixed size of four elements, the insertion of element 1212 displaces an element at the end of queue 1202 (e.g., element 1204).

After inserting the parameters, process 1100 may move to step 1122. At step 1122, the NVM interface can move the sliding window forward in the tree by a number of entries equal to a number of entries in the plurality of entries. For example, referring back to FIG. 4, the NVM interface can move sliding window 406 forward by five entries. That is, the first entry of the newly moved sliding window 406 can correspond to file L. Process 1100 may then move to step 1114, where the NVM interface can determine whether the sliding window has passed the end of the tree.

Referring back to step 1118, if the NVM interface instead determines that the parameters are not insertable, process 1100 may move to step 1112. At step 1112, the NVM interface can move the sliding window forward in the tree by a single entry.

Using such an approach, the NVM interface can locate multiple candidate sets of entries that are disjointed in a logical space, where each set of entries can be combined as a single entry or node in the tree. As a result, the NVM interface can amortize scanning the tree across many tree flattening operations. This can be particularly useful because tree scanning is costly in terms of processing efficiencies (e.g., requires a high number of memory operations and cache thrashes). Thus, if the NVM interface can produce multiple candidates on a single pass through the tree, system efficiency can be improved. Moreover, by moving the sliding window forward in the tree by a number of entries equal to the number of entries encompassed by the sliding window, the NVM interface can avoid having to reconsider the same entries after having inserted associated parameters in the priority queue.

In some embodiments, the NVM interface can combine multiple sliding windows or a greedy algorithm to process 1100 (FIG. 11). For example, using a process similar to process 800 (FIG. 8), the NVM interface can detect entries that fit into two or more sliding windows. The NVM interface can then attempt to insert parameters associated with entries of the two or more sliding windows to two or more priority queues, where each priority queue can be associated with one of the two or more sliding windows.

As another example, using a process similar to process 1000 (FIGS. 10A and 10B), the NVM interface can determine, based on the priority queue, whether an optimal set of entries has been detected. In particular, the total span of an optimal set of entries encompassed by a sliding window may have a value equal to the number of entries in the optimal set of entries. That is, for a sliding window that encompasses 32 entries, the total span of an optimal set of entries may also be 32.

In response to determining that the optimal set of entries has been detected, the NVM interface can expand a pre-determined number of entries encompassed by the sliding window to generate an expanded sliding window. The NVM interface can then apply the expanded sliding window to the tree.

In yet further embodiments, instead of searching a tree only when the amount of memory currently available for the tree is below a pre-determined threshold, the NVM interface can maintain a priority queue of candidate sets of entries while performing tree updates. In particular, while the NVM interface is updating a node of a tree (e.g., by adding one or more entries, removing one or more entries, and/or changing the size of one or more entries), the NVM interface may need to uncompress and read out the contents of a node into memory (e.g., memory 114 of FIG. 1). During this process, because the node has already been uncompressed, the NVM interface can easily obtain parameters associated with the node with only a few additional operations. These parameters can then be saved to a priority queue.

Similar to priority queue 1204 (FIG. 12), the priority queue maintained during tree updates can include any suitable number of elements. Each element can be associated with one or more parameters such as, for example, a merit, a total span, and/or a starting LBA of a node.

Figure 13:
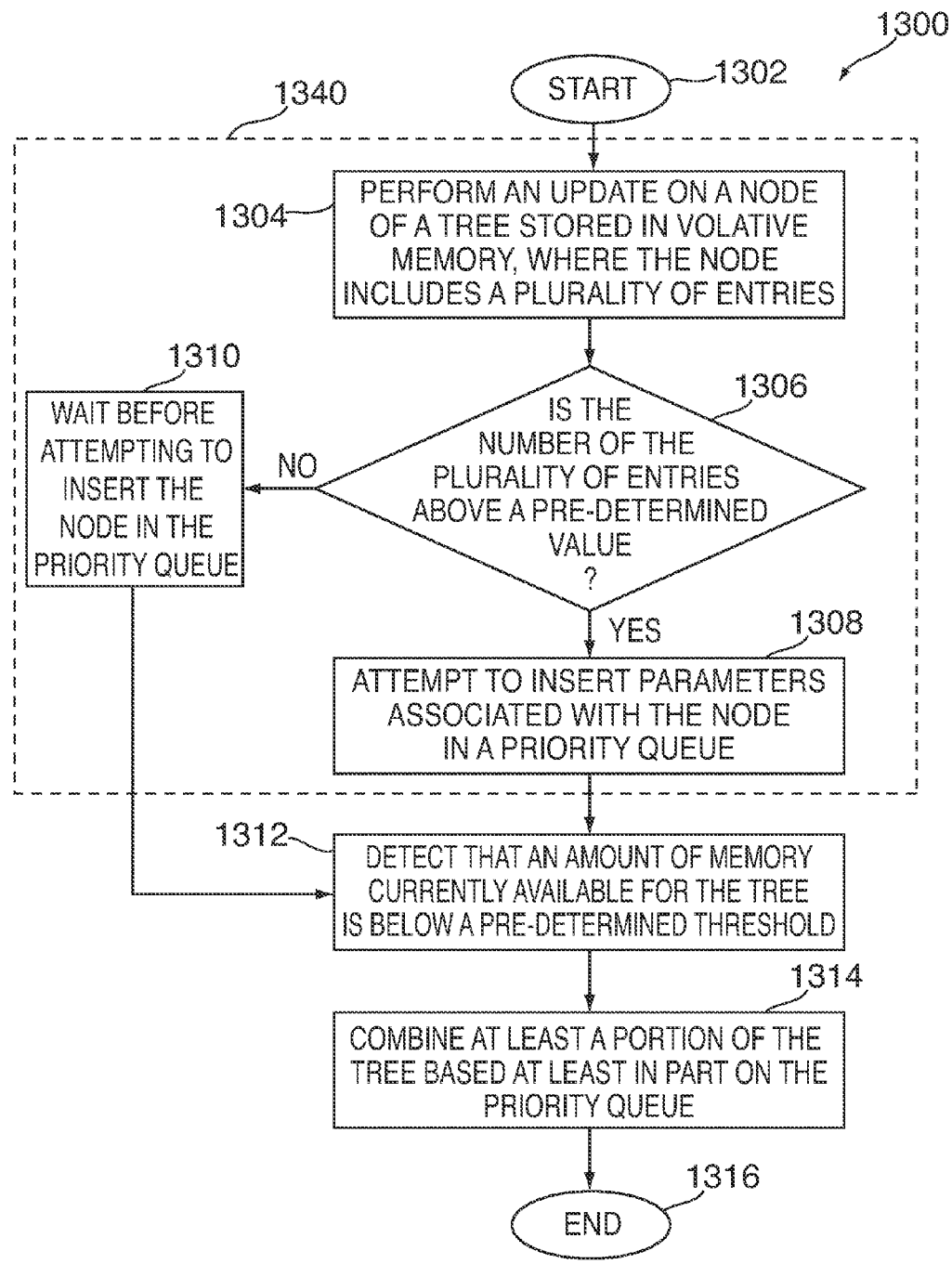
FIG. 13 is a flowchart of a further illustrative process for faster tree flattening in accordance with various embodiments of the invention.

Referring now to FIG. 13, a flowchart of process 1300 for tree flattening using a priority queue maintained during tree updates is shown. Process 1300 may begin at step 1302, and at step 1304, the NVM interface (e.g., NVM interface 118 of FIG. 1 or NVM interface 218 of FIG. 2) can perform an update on a node of a tree stored in volatile memory (e.g., volatile memory 114 of FIG. 1), where the node includes a plurality of entries.

Then, at step 1306, the NVM interface can detect whether the number of plurality of entries is above a pre-determined value. Thus, in order to improve efficiency, the NVM interface may only consider whether a node should be inserted into the priority queue if the node is relatively full or has a high usage. In some cases, for example, the NVM interface can apply a filter to determine whether the node is relatively full. Alternatively, the NVM interface can determine the amount of use associated with a node.

If the NVM interface detects that the number of plurality of entries is above a pre-determined value, process 1300 may move to step 1308. At step 1308, the NVM interface can attempt to insert parameters associated with the node in a priority queue. For example, the NVM interface can obtain a total span and a starting LBA for the entries of the node. Because a node can store a variable number of entries (e.g., 10 to 16 entries), the NVM interface may need to calculate a merit for the node, where the merit can function as the priority number in a priority queue. In some embodiments, the calculated merit can be based on a ratio between the total span of the entries and the number of entries. For example, the calculated merit can be equal to the ratio between the total span of the entries and the number of entries. As another example, the resulting ratio may be multiplied by a weight in order to generate an integer value for the merit. In both of these embodiments, the priority queue can be a minimum priority queue, such that elements in the priority queue are stored in ascending order based on the merit.

As a further example, the merit can be an inverse of the calculated merit. As such, the priority queue can be a maximum priority queue, such that the elements are stored in descending order based on the merit. In yet further embodiments, instead of using the number of entries to calculate the merit, the NVM interface can use byte usage to calculate the merit.

Referring now to FIG. 14, block diagram 1400 of priority queue 1402 is shown. Priority queue 1402 can include four elements, where each element can be associated with a merit, a total span, and a starting LBA. As shown, priority queue 1402 can be a minimum priority queue, such that the elements are sorted in ascending order based on the merit. Correspondingly, the element with the lowest priority number (e.g., the lowest merit) can move to the front of the queue. Persons skilled in the art will appreciate that priority queue 1402 can include any suitable number of elements. For the sake of simplicity, however, priority queue 1402 is shown to include four elements.

As discussed, the merit can be equal to the ratio between the total span of the entries and the number of entries. Thus, assuming that a node corresponding to element 1404 has 10 entries, the merit of the node may have a value of 42, which is equal to the ratio between the total span of the entries and the number of entries of the node (420/10=42). Similar calculations can be performed for the merits of elements 1406-1410.

If the merit of a node to be inserted is less than the highest merit currently stored in priority queue 1402, the NVM interface can insert the associated parameters at an appropriate location in queue 1402. If, however, the merit of a node is greater than the highest merit currently stored in priority queue 1402, the NVM interface can discard the associated parameters.

Referring back to step 1306 of FIG. 13, if the NVM interface instead detects that the number of plurality of entries is below a pre-determined value, process 1300 may move to step 1310. In particular, the NVM interface may determine that the node is not full.

At step 1310, the NVM interface can wait before attempting to insert the node in the priority queue. That is, the NVM interface can bypass the node, and wait until additional entries have been added to the node (e.g., the amount of use has increased).

Persons skilled in the art will appreciate that sub-process 1340 (indicated by the dotted box in FIG. 13) may be executed for multiple nodes of a tree. In particular, the NVM interface can iterate across each node of a tree that is being updated, and attempt to add the node to a priority queue.

From each of steps 1310 and 1308, process 1300 may move to step 1312. In particular, at step 1312, the NVM interface may detect that an amount of memory currently available for the tree is below a pre-determined threshold. Then, at step 1314, the NVM interface can combine at least a portion of the tree based at least in part on the priority queue.

For example, based on the priority queue, the NVM interface can determine an optimal node having entries that can be combined. Thus, for a minimum priority queue, the NVM interface can take the first element in the priority queue as the optimal node. If each node of the tree is capable of storing 10 to 16 entries, an optimal node may include 16 entries, where each entry has a span of one LBA.

In some embodiments, once the NVM interface has determined an optimal node, the NVM interface can detect if the amount of additional memory needed for the tree exceeds an amount of memory that can be freed up by combining the entries of the optimal node. If the NVM interface detects that the amount of additional memory needed is less than or equal to the amount of memory that can be freed up by combining the entries, the NVM interface can combine those entries without having to do additional searches of the tree.

If, however, the NVM interface detects that the amount of additional memory needed is greater than the amount of memory that can be freed up by combining the entries, the NVM interface can use any other suitable process to find another set of entries to flatten. For example, the NVM interface can move at least one sliding window across the tree, and can combine at least a portion of the tree using the at least one sliding window. For instance, the NVM interface can use a process similar to one or more of processes 800, 1000, and 1100 of FIGS. 8, 10A and 10B, and 11, respectively. Process 1300 may then end at step 1316.

As compared to an exhaustive search of a tree, the above-described approach can produce good flattening candidates in a relatively short amount of time. Moreover, memory can be immediately released after tree flattening (e.g., the total span can be addressed in a parent node) without requiring expensive tree rebalance operations.

It should be understood that processes 800, 900, 1000, 1100, and 1300 of FIGS. 8, 9, 10A-10B, 11, and 13 may be executed by one or more components in a system (e.g., electronic device 100 of FIG. 1 or electronic device 200 of FIG. 2). For example, at least some of the steps in the processes may be performed by a NVM interface (e.g., NVM interface 118 of FIG. 1 or NVM interface 218 of FIG. 2). Persons skilled in the art will appreciate that one or more of the steps may be performed by a control circuitry (e.g., SoC control circuitry 112 of FIG. 1).

Furthermore, it should be understood that processes 800, 900, 1000, 1100, and 1300 of FIGS. 8, 9, 10A-10B, 11, and 13 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for faster tree flattening, the method comprising:
    detecting that an amount of memory currently available for a tree is below a pre-determined threshold, wherein the tree stores a logical-to-physical mapping between a logical space and physical addresses of a non-volatile memory ("NVM");
    moving at least two sliding windows across the tree;
    maintaining at least two minimum spans corresponding to the at least two sliding windows as the at least two sliding windows move across the tree;
    determining that the at least two sliding windows have finished moving across the tree; and
    selecting to flatten a set of entries of the tree based at least in part on a comparison between the at least two minimum spans.

2. The method of claim 1, wherein the at least two sliding windows each encompass a different number of entries of the tree.

3. The method of claim 1, wherein the set of entries comprises logically contiguous entries.

4. The method of claim 1, wherein the maintaining the at least two minimum spans comprises:
    for each of the at least two sliding windows, adding a span of an entry newly encompassed by the sliding window to a running counter; and
    subtracting a span of an entry no longer encompassed by the sliding window from the running counter.

5. The method of claim 4, further comprising:
    comparing the running counter to a minimum span saved in volatile memory; and
    determining whether the running counter is less than the minimum span;
    in response to determining that the running counter is less than the minimum space, replacing the running counter as the minimum span.

6. The method of claim 5, further comprising in response to determining that the running counter is greater than the minimum span, keeping the minimum span.

7. The method of claim 1, wherein the selecting comprises determining which of the at least two minimum spans has the smaller value.

8. The method of claim 1, wherein the at least two sliding windows are moving across the tree in parallel.

9. The method of claim 1, wherein the at least two sliding windows are moving across the tree consecutively.

10. A system comprising:
    non-volatile memory ("NVM");
    volatile memory for storing a tree comprising a plurality of entries, wherein the tree provides a logical-to-physical mapping between a logical space and physical addresses of the NVM; and
    memory interface comprising control circuitry operative to:
    detect that an amount of memory currently available for the tree is below a pre-determined threshold;
    move a sliding window across the plurality of entries of the tree, wherein the sliding window encompasses a pre-determined number of entries of the tree;
    determine that a set of entries encompassed by the sliding window has a span equal to the number of entries in the set of entries;
    expand the pre-determined number of entries encompassed by the sliding window to generate an expanded sliding window; and
    apply the expanded sliding window to at least a portion of the plurality of entries of the tree.

11. The system of claim 10, wherein the control circuitry is operative to expand the pre-determined number of entries of the sliding window by a multiple of the size of a stripe of the NVM.

12. The system of claim 10, wherein the control circuitry is operative to expand the sliding window to align with a stripe-boundary.

13. The system of claim 10, wherein the control circuitry is operative to:
    determine if the value of a running counter produced by the expanded sliding window is equal to a pre-determined value; and in response to determining that the value of the running counter produced by the expanded sliding window is equal to the pre-determined value, select a set of entries of the tree produced by the expanded sliding window for tree flattening.

14. The system of claim 13, wherein in response to determining that the value of the running counter produced by the expanded window is not equal to the pre-determined value, the control circuitry is operative to select the set of entries of the tree produced by the sliding window for tree flattening.

15. The system of claim 14 further comprising a bus controller for communicating with the NVM, and wherein the control circuitry is operative to:
  direct the bus controller to read data corresponding to the set of entries from the NVM;
  save the data in the volatile memory; and
  direct the bus controller to program the data sequentially to a super block of the NVM.

16. The system of claim 13 wherein the control circuitry is operative to flatten the tree by combining the set of entries into a single entry.

17. A memory interface for accessing a non-volatile memory ("NVM"), the memory interface comprising control circuitry, using a processor, operative to:
  detect that an amount of memory currently available for a tree stored in volatile memory is below a pre-determined threshold;
  detect a first plurality of entries of a tree that fit into a sliding window;
  attempt to insert parameters associated with the first plurality of entries in a priority queue; and
  move the sliding window forward in the tree by a number of entries, wherein the number of entries is based at least in part on a current state of the priority queue.

18. The memory interface of claim 17, wherein the control circuitry, using a processor, is operative to:
  detect that the sliding window has finished moving across the tree; and
  locate an optimal set of entries using the priority queue.

19. The memory interface of claim 17, wherein the control circuitry, using a processor, is further operative to:
  determine whether the priority queue is full;
  in response to determining that the priority queue is not full, insert the parameters associated with the first plurality of entries in the priority queue; and
  move the sliding window forward in the tree by a single entry.

20. The memory interface of claim 18, wherein in response to determining that the priority queue is full, the control circuitry, using a processor, is further operative to:
  determine whether the parameters associated with the first plurality of entries are insertable;
  in response to determining that the parameters are insertable, inserting the parameters in the priority queue; and
  move the sliding window forward in the tree by a number of entries equal to a number of entries in the first plurality of entries.

21. The memory interface of claim 20, wherein the control circuitry, using a processor, is further operative to displace an element at the end of the priority queue.

22. The memory interface of claim 20, wherein in response to determining that the parameters are not insertable, the control circuitry, using a processor, is operative to move the sliding window forward in the tree by a single entry.

23. The memory interface of claim 17, wherein the parameters comprise at least one of a total span and a starting logical block address ("LBA") associated with the first plurality of entries.

24. The memory interface of claim 17, wherein the control circuitry, using a processor, is further operative to initialize the priority queue to a set of empty values.

25. The memory interface of claim 17, wherein the priority queue is an ordered list, wherein elements with lower priority numbers move to the front of the list, and elements with higher priority numbers move to the end of the list.

26. The memory interface of claim 17, wherein the control circuitry, using a processor, is operative to:
  detect a second plurality of entries of the tree that fit into an additional sliding window; and
  attempt to insert the parameters associated with the first plurality of entries and parameters associated with the second plurality of entries to at least two priority queues, wherein each of the at least two priority queues is associated with one of the sliding window and the additional sliding window.

27. The memory interface of claim 17, wherein the control circuitry, using a processor, is operative to:
  determine, based on the priority queue, whether an optimal set of entries has been detected;
  in response to determining that an optimal set of entries has been detected, expand a pre-determined number of entries encompassed by the sliding window to generate an expanded sliding window; and
  apply the expanded sliding window to the tree.

28. A method for monitoring fragments in a tree, the method comprising:
  performing an update on a node of a tree stored in volatile memory, wherein the node comprises a plurality of entries;
  detecting whether the number of the plurality of entries is above a pre-determined value;
  in response to detecting that the number of the plurality of entries is above the pre-determined value, attempting to insert parameters associated with the node in a priority queue;
  detecting that an amount of memory currently available for the tree is below a pre-determined threshold; and
  combining at least a portion of the tree based at least in part on the priority queue.

29. The method of claim 28, further comprising iterating across each node of a plurality of nodes of the tree that is being updated.

30. The method of claim 28, wherein the parameters comprises a merit, a starting logical block address ("LBA"), and a total span of the node.

31. The method of claim 30, wherein the merit is based on a ratio between the total span and the number of the plurality of entries.

32. The method of claim 31, further comprising multiplying the merit by a weight in order to generate an integer value for the merit.

33. The method of claim 28, further comprising wherein in response to determining that the number of the plurality of entries is below the pre-determined threshold, waiting before attempting to insert the node in the priority queue.

34. The method of claim 28, wherein the combining the at least a portion of the tree further comprises:
  determining an optimal node comprising a plurality of entries that are combinable based on the priority queue;

detecting that the amount of additional memory needed for the tree is greater than an amount of memory freed up by combining the plurality of entries of the optimal node;
moving at least one sliding window across the tree; and
combining at least a portion of the tree using the at least one sliding window.

* * * * *